United States Patent [19]

Liu

[11] Patent Number: 5,153,106

[45] Date of Patent: Oct. 6, 1992

[54] DIRECT COLOR IMAGING WITH LASER IN A WRITING MODE

[75] Inventor: Kou-Chang Liu, Wayne, N.J.

[73] Assignee: ISP Investments Inc., Wilmington, Del.

[21] Appl. No.: 667,129

[22] Filed: Mar. 11, 1991

[51] Int. Cl.$^5$ ................................................ G03C 1/73
[52] U.S. Cl. ..................................... 430/340; 430/270; 430/346; 430/945; 430/964
[58] Field of Search ................... 346/76 L, 135.1; 430/286, 495, 340, 270, 346, 964, 945

[56] References Cited

U.S. PATENT DOCUMENTS

| | | | |
|---|---|---|---|
| 3,723,121 | 3/1973 | Hauser | 430/20 |
| 3,772,028 | 11/1973 | Fico | 430/495 |
| 4,215,208 | 7/1980 | Yee et al. | 526/285 |
| 4,297,470 | 10/1981 | Osada | 526/304 |
| 4,389,217 | 6/1983 | Baughman et al. | 436/2 |
| 4,536,473 | 8/1985 | Mihara | 430/575 |
| 4,649,100 | 3/1987 | Leyrer et al. | 430/326 |
| 4,678,736 | 7/1987 | Hanamura | 430/270 |
| 4,684,688 | 8/1987 | Moskowitz | 524/336 |
| 4,705,742 | 11/1987 | Lewis | 430/333 |
| 4,753,861 | 6/1988 | Tsou et al. | 430/19 |
| 4,863,832 | 9/1989 | Saitoh et al. | 430/281 |
| 4,957,851 | 9/1990 | Tomida | 430/272 |
| 5,004,671 | 4/1991 | Nishimura | 430/286 |
| 5,049,428 | 9/1991 | Kanno et al. | 428/64 |

*Primary Examiner*—Charles L. Bowers, Jr.
*Assistant Examiner*—John A. McPherson
*Attorney, Agent, or Firm*—Marilyn J. Maue; Joshua J. Ward

[57] ABSTRACT

The invention relates to a process for direct and permanent photopositive scribing on a thermochromic coating composition consisting essentially of certain thermosensitive aryl diacetylenes which contain a moiety selected from the group of sulfonyl, amino, urethanyl, carboxylate and nitro radicals, and a dye capable of absorbing radiation energy generated by a laser in a wavelength of from about 600 to about 1,500 nm and to the coating composition comprising said aryl diacetylene and energy absorbing dye.

11 Claims, No Drawings

DIRECT COLOR IMAGING WITH LASER IN A WRITING MODE

BACKGROUND OF THE INVENTION

Polyacetylenic compounds have been used as recording layers for optical disks, digital recordings and similar information storage devices by a process calling for visually imaging the polyacetylenic film with short wavelength radiation as generated by electron beam, gamma-ray, X-ray, beta-ray, neutron particles and the like. The absorption limitations of known polyacetylenes, i.e. up to about 400 nm, excludes the economical and efficient laser imaging which is generally effected at wavelengths of about 600 nm or higher. Visual images are those images which are clearly recognizable by the human eye and are characterized by high optical contrast in one or more of the red, green and blue portions of the spectrum. High optical contrast is defined as an optical density difference of at least 1.0 between the maximum density and minimum density portions of the image, where optical density is defined as $\log_{10}(1/\text{transmittance})$ for transmitted light and $\log_{10}(1/\text{reflectance})$ for reflected light. Such visual imaging is significantly distinguished from prior data recording where image contrast is relatively low and not easily discernable by the human eye or without high magnification. In several cases laser imaging at wavelengths above 400 nm, based on the thermal color change of the polyacetylenic compound to develop a useful visual image, has been attempted, but it has been found that cumbersome high-output equipment, e.g. argon, metal-vapor or gas lasers and the like are required. Relatively low-output compact lasers, in the 650-1500 nm wavelength range, fail to imprint on either known polyacetylenes or their polymers, particularly in relatively thick layers required to produce useful visual images as opposed to the relatively thin layers needed for digital data recording.

A successful color imaging process for polyacetylenes with a scripting laser operating at a wavelength of 600 nm or higher has been described in copending Pat. application Ser. No. 601,537, filed Oct. 23, 1990, and entitled "Laser Imaging Composition". However, this process involves exposing a polyacetylene-dye composition to create a latent image in a first process step followed by an overall exposure with short wavelength radiation to develop a distinguishing background color of the latent image in the second stage of the process so as to provide a photonegative transmission of the original image. While highly effective, such a process requires several processing steps and is unable to generate a photopositive visual image of the transmitted pattern by exposure to a semi-conductor laser operating within desirable wavelength range of from about 600 to about 1,500 nm. Accordingly, it is the aim of research, with consideration to cost performance and production efficiency, to provide a simplified process with an organic system most suitable for visual imaging and optical data recording which is directly imageable at a laser output energy in the 600–1,500 nm wavelength range characteristic of compact semi-conductor diode lasers and which directly provides a photopositive reproduction.

It is an object of the present invention to achieve the above criteria at low cost, high performance and high production efficiency.

Another object of this invention is to provide a process for directly imaging a film to a positive, high color-contrasted transmission by exposure to semi-conductor laser emission.

Still another object of this invention is to provide a thermochromic, polyacetylenic composition which is directly polymerizable to a colored image upon exposure to a laser emission generated at relatively high wavelengths, up to about 1,500 nm.

These and other objects of the invention will become apparent from the following description and disclosure.

THE INVENTION

In accordance with this invention there is provided a processless thermal imaging composition which comprises a dye capable of absorbing energy within the wavelength of a scripting laser and a thermosensitive diacetylene within a certain unique group which composition is directly and visually imageable to a photopositive transmission by controlled impingement of emanations from said laser operating in a scripting mode.

Of the diacetylenic compounds, many are known to have no imageable properties whatever. It has been found that the imaging capability by those isomers and homologs within the diacetylene group is highly unpredictable. Of the imageable diacetylenes, it is generally accepted that they are not receptive to polymerization with color development by exposure to radiation generated in a wavelength above about 400 nm. However, it has now been found that a composition containing certain aryl diacetylenes having a sulfonyl, amino, urethanyl, carboxylate or nitro group when used in combination with a laser energy absorbing dye are capable of undergoing instantaneous polymerization to a visual and photopositive image upon exposure to laser emission generated within a wavelength of from about 600 to about 1,500 nm.

By "processless" composition or film referred to above is meant that no chemical or physical alteration of the composition or film is required before or after direct imaging with a laser or similar light source which generates energy within a wavelength of from about 600 to about 1,500 nm.

The selective group of thermosensitive aryl diacetylenes of this invention is defined as symmetrical, conjugated compounds of the formula

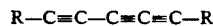

wherein the R substituent is described in the following Table.

TABLE A

| R Substituent | Radical of |
|---|---|
| 1. F—C$_6$H$_4$—SO$_2$—OCH$_2$— | methyl fluorophenyl-sulfonic acid |
| 2. C$_{10}$H$_7$—SO$_2$—OCH$_2$— | methyl naphthylene-sulfonic acid |
| 3. 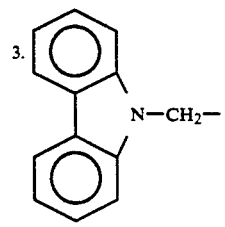 | methyl carbazole |

TABLE A-continued

| R Substituent | Radical of |
|---|---|
| 4. $C_6H_5-NHCOOCH_2-$ | N-phenyl methylcarbamate |
| 5. $CH_3-C_6H_4NHCOOCH_2-$ | N-methylphenyl methylcarbamate |
| 6. $C_6H_5-COOCH_2-$ | methyl benzoate |
| 7. $(NO_2)_2C_6H_3-CH_2-$ | dinitrotoluene |
| 8. $(C_6H_5)_2N-CH_2-$ | diphenylmethyl amine |

This unique group of aryl diacetylenes possess superior photographic properties as observed in their high thermal polymerization sensitivity, direct color transition and color stability and image acuity. As imageable agents these polyacetylenes can be employed individually or in admixtures with the present energy absorbing dyes of the composition. The aryl diacetylenes of this invention are known and can be prepared by catalytic oxidative coupling of

in a suitable solvent such as tetrahydrofuran (THF), dimethyl ether of ethylene glycol, etc. at a temperature of between about 25° C. and about 70° C., preferably between about 40° C. and about 50° C., under atmospheric pressure. For example, oxygen coupling of a 25% THF solution of dinitrotolylacetylene is effected at 45° C. in the presence of cuprous chloride/tetramethyl ethylene diamine within a period of from 2 to 8 hours. The other aryl acetylenes are similarly prepared by substitution of the respective monoacetylene reactants.

Energy absorbing dye compounds employed in the compositions of this invention transmit heat to the diacetylenic compound causing polymerization and immediate color development in the areas of diacetylene impinged by radiation. These energy absorbing, heat transmitting compounds are complex and quaternized dyes such as the polycarbocyanine dyes disclosed in copending U.S. Pat. application Ser. No. 601,537, filed Oct. 23, 1990, entitled LASER IMAGEABLE COMPOSITION incorporated herein by reference. Other suitable energy absorbing dyes include metal complexes such as diimine iron complex, dithiol nickel complex, indigo, anthraquinone, azulenium, polycarbocyanine, squarylium, indolizinium, naphthalocyanine, naphthoquinone and its analogs, phthalocyanine, polymethine, pyrylium, thiapyrylium, telluropyrylium, triaryl ammonium, triquinocycloalkane, or the specific dyes disclosed in the Journal of Imaging Science, Volume 32, number 2, Mar./Apr. 1988, pages 51-56 (ORGANIC ACTIVE LAYER MATERIALS FOR OPTICAL RECORDING by James E. Kuder); Chemistry in Britain, Nov. 1986, pages 997-1000 (MODERN DYE CHEMISTRY by J. Griffiths); Angewandte Chemie, Volume 28, number 6, June 1989, pages 677-828 (SEARCH FOR HIGHLY COLORED ORGANIC COMPOUNDS by Jurgen Fabian et al.); Journal of Imaging Technology, Volume 12, Number 3, June 1986, pages 140-143, (ORGANIC MATERIALS FOR OPTICAL DATA STORAGE MEDIA—AN OVERVIEW by James E. Kuder), and Kirk-Othmer's Encyclopedia of Chemical Technology, Second Edition, Vol. 6, pages 605-609 and 611-624, all incorporated herein by reference. Preferred of the above group are the nitrogen containing dyes having a wavelength absorption within the range of 800 to 1500 nm when used with laser emissions generated in a similar wavelength.

The molar ratio of the diacetylene to dye in the present composition can vary from about 1:0.01 to about 1:5, preferably from about 1:0.1 to about 1:1.

As a guide for the selection of an energy absorbing compound in a wavelength similar to transmission of a particular laser imaging device, the following table provides specific examples of wavelength absorbance. However, these dyes are in no way limiting to the scope of energy absorbing compounds useful in this invention.

TABLE B

| Dye | Wavelength Absorption |
|---|---|
| Aromatic annulenes | 768 nm |
| Al tetraazaporphyrins | 1204 nm |
| Ni dithiolenes | 1298 nm |
| Streptopolymethines | 1500 nm |
| Silenoxanthenylium | 802 nm |
| Azo | 778 nm |
| Indophenols and Analogues | 761 nm |
| Thermochromic dianthrone | 675 nm |
| Betaines | 934 nm |
| Divinyl benzothiazole | 640 nm |
| Trivinyl benzothiazole | 750 nm |
| Diethyl carbocyanine iodide | 700 nm |

Preferred of the above dyes are the water soluble nitrogen containing compounds, most preferably the water soluble polycarbocyanine, betain and tetraazaporphyrin dyes. It is also to be understood that mixtures of these dyes can be employed. For example, 1:20 to 20:1 mixtures of polycarbocyanine and squarylium dye mixtures are useful and can provide the energy absorption and heat needed to thermally activate the thermosensitive diacetylene at these higher wavelength transmissions. The energy absorbing adjuvant is added and intimately mixed with the polyacetylene, preferably in a dispersion, prior to coating and drying on a substrate. The amount of dye employed is sufficient to provide a peak optical density of between about 0.1 and about 3, preferably between about 0.2 and about 2, in the dried coating. In cases where the dye is not water soluble it can be dissolved in a suitable inert solvent such as a ketone, alcohol, ester, hydrocarbon and the like for addition to a diacetylene dispersion. The preferable dye solvents are those which are at least water miscible.

Suitable substrates for the present compositions include polyethylene terephthalate, nylon, polystyrene, cellulose acetate, cellulose nitrate, cellophane, polyvinyl chloride, polyvinylidene chloride, teflon, polychlorotrifluoro- ethylene, polyethylene, polypropylene, paper, ceramic, glass, metal, wood and the like.

Coatings of the present diacetylene-dye compositions are conveniently prepared from aqueous dispersions wherein the diacetylene crystals, having an average particle diameter of between about 0.02 um and about 5 um, preferably between about 0.1 um and about 1 um, are dispersed with dye in a binder solution, preferably an aqueous binder solution, to provide a dispersion, emulsion or suspension containing from about 1 to about 50 wt. % solids, preferably from about 4 to about 20 wt. % solids. The liquid dispersion may then be coated on a substrate and dried. Other coating alternatives to the dispersion layer coating include the deposition of a monomolecular layer of the diacetylene dye composition as formed by the Langmuir-Blodgette, spin or spray coating methods. After coating on the substrate and the resulting imageable film is dried, it is ready for imaging.

Exemplary of binder materials for use in dispersions include natural and synthetic plastics, resins, waxes, colloids, gels and the like including gelatins, desirably photographic-grade gelatin, various polysaccharides including dextran, dextrin, hydrophilic cellulose ethers and esters, acetylated starches, natural and synthetic waxes including paraffin, beeswax, polyvinyl-lactams, polymers of acrylic and methacrylic esters and amides, hydrolyzed interpolymers of vinyl acetate and unsaturated addition polymerizable compounds such as maleic anhydride, acrylic and methylacrylic esters and styrene, vinyl acetate polymers and copolymers and their derivatives including completely and partially hydrolyzed products thereof, polyvinyl acetate, polyvinyl alcohol, polyethylene oxide polymers, polyvinylpyrrolidone, polyvinyl acetals including polyvinyl acetaldehyde acetal, polyvinyl butyraldehyde acetal, polyvinyl sodium-o-sulfobenzaldehyde acetal, polyvinyl formaldehyde acetal, and numerous other known photographic binder materials, or mixtures of binder materials, including a substantial number of aforelisted useful plastic and resinous substrate materials which are capable of being placed in the form of a dope, solution, dispersion, gel, or the like for incorporation therein the thermosensitive aryl diacetylene-dye composition and capable of processing to a solid form containing dispersed crystals of the thermosensitive crystalline diacetylene. As is well known in the art in the preparation of smooth uniform continuous coatings of binder materials, there may be employed therewith small amounts of conventional coating aids as viscosity controlling agents, surface active agents, leveling agents dispersing agents and the like.

For the purposes of the present invention, the image receptive layer is usually the surface layer of the imaging film and may comprise the diacetylenic microcrystals fixedly suspended and uniformly distributed with dye in a binder material. However, a protective layer can be applied over the diacetylene diether containing surface layer, e.g. to prevent damage due to abrasion, moisture, etc. Liquid dispersions of normally crystalline diacetylenic compounds may or may not be aged before drying and imaging according to the process disclosed in U.S. Pat. No. 4,734,355, which is incorporated herein by reference.

After preparing the dried coating of the diacetylene-dye composition on the substrate, it is exposed to laser emissions which impinge on the coating surface in a design consistent with a desired image, laser radiation energy is absorbed by the dye and converted to heat which is transmitted to the aryl diacetylene causing polymerization and an immediate permanent color change in the impinged areas of the thermosensitive diacetylene compound. Alternatively, the compositions disclosed in this patent application may be used to record binary digital information for high density data recording. The light sources disclosed herein have an output energy of up to 1500 nm, preferably within a range of from about 800 to about 1500 nm and a power sufficient to generate a temperature greater than 40° C., preferably greater than 80° C., to polymerize the thermosensitive aryl diacetylene in discrete impinged areas. Lasers, or other light sources, transmitting energy in the 600–1500 nm output range provide high image resolution, which is an important consideration in recording data transmissions. At an output range of 600 and above, high speed can be achieved as well. For example, using a laser beam diameter of 0.5 to 2 um, an exposure time of 180–250 ns/dot and output of 2.5–3.5 mW, an image is encoded on the diacetylene monomer which has excellent resolution and high color contrast. Generally the speed of recording and density varies directly with the output power of the laser and the thickness of the composition coating. Accordingly, thin coatings of from about 0.02 to 100 micrometers, preferably from about 0.1 to 5 micrometer are recommended, whereupon the optical density change within the imaged area is from about 1.0 to greater than 5.0 density units and preferably from about 1.5 to about 4.5 density units.

Exemplary of the light sources which may be employed for imaging are a helium-neon laser, ruby laser, GaAlAs laser, xenon arc lamp, mercury arc lamp, neodynium yttrium aluminum garnet laser, tungsten-quartz halogen lamp, argon laser, Nd(YAG) laser and the like.

The present processless compositions are unique in that they undergo an immediate and permanent color change in areas impinged by laser emissions in the 600–1500 nm wavelength range, which capability is in sharp contrast to other polymerization imageable diacetylene compositions which require short wavelength exposure to develop background color for a colorless latent image transmitted by laser exposure. Consequently, the later polyacetylene compositions can provide only a photonegative image of the pattern transmitted. The imaging process of this invention also provides many advantages over others heretofore employed. Specifically, processing steps are eliminated by direct visual imaging. Further, the need for radiation at different wavelengths is avoided and a photopositive image in high acuity is directly achieved.

Having thus described the invention, reference is now had to the following examples which illustrate preferred embodiments but which are not to be construed as limiting to the scope of the invention which is more broadly defined above and in the appended claims.

EXAMPLE I

Twenty grams of 1,6-(2,4)-dinitrophenyl-2,4-hexadiyn mixed with 3,3'-diethylthiatricarbocyanine iodide dye in a mole ratio of 1:4. The resulting mixture is stirred at room temperature for uniform distribution of components and then added to an aqueous solution 15 g. of photographic grade gelatin in 0.6 g. of ALKANOL XC[(1)]. The resulting mixture is subjected to high shear mixing to provide an aqueous dispersion of 20% solids. The dispersion is then chill set at 5° C. after which it is dried in a vacuum oven at 20° C. and reconstituted with water to good coating consistency.

The reconstituted dispersion is then coated and dried to a 2 um film thickness on a paper support. The resulting supported composition is exposed to emissions from a GaAlAs semi-conductor diode laser with a wavelength of about 830 nm. The laser emission is focused onto the surface of the composition and scanned across the surface at the rate of about 300 cm/sec. in a desired cross hatched pattern. The power output of the laser varies in the range of from about 3 mJ/Cm$^2$ to about 5 J/cm$^2$. An immediate permanent blue correspondingly cross hatched pattern of high resolution and edge acuity is transmitted on the colorless background of the supported film.

The above example is repeated for each of the polyacetylenes listed in Table A. In each case an immediate sharp, highly color contrasted photopositive image is transmitted to the imageable film.

Any of the above light sources can be used with any of the aforementioned complimentary energy absorbing dyes and substituted in the above examples to directly provide a photopositive image of high color contrast and edge acuity. Many other variations and modifications can also be employed without departing from the scope of this invention. For example, the dry supported composition can contain a plurality of thermosensitive diacetylene monomers which are polymerized to different colors at various temperatures. These compositions can be partially and separately imaged in distinctive colors by separate exposures to light sources generated at different powers of exposure provided that the absorbing dye or dyes in the composition are capable of transmitting heat at the various polymerization temperatures of the diacetylene monomers.

What is claimed is:

1. A composition visually imageable by radiation generated in a wavelength of from about 600 to about 1,500 nm which comprises: a mixture of a dye component capable of absorbing radiation energy generated at a wavelength of from about 600 to about 1,500 nm and a thermochromic aryl diacetylene component having the formula

R—C≡C—C≡C—R wherein R is selected from a radical of the group consisting of methyl fluorophenylsulfate, methyl naphthylenesulfate, methyl carbazole, N-phenyl methylcarbamate, N-tolyl methylcarbamate, methyl benzoate, dinitrotoluene and diphenyl methylamine.

2. The composition of claim 1 wherein said dye component is a nitrogen containing dye.

3. The composition of claim 2 wherein said dye component is selected from the group of a polycarbocyanine, betain, squarylium, and tetrazaporphyrin dyes.

4. The composition of claim 1 wherein the mole ratio of said aryl diacetylene to said dye component is between about 1:0.01 and about 1:5.

5. The composition of claim 1 wherein said aryl diacetylene has a thermochromic sensitivity above 40° C.

6. The composition of claim 1 wherein said aryl diacetylene has a thermochromic sensitivity above 80° C.

7. The composition of claim 1 wherein said aryl diacetylene has the formula $FC_6H_4—SO_2—OCH_2—C≡C—C≡C—CH_2O—SO_2—C_6H_4F$.

8. The composition of claim 1 wherein said aryl diacetylene has the formula $(NO_2)_2C_6H_3CH_2—C≡C—C≡C—CH_2C_6H_3(NO_2)_2$.

9. The composition of claim 7 wherein said dye is a betain dye.

10. The composition of claim 8 wherein said dye is an aluminum tetraazaporphyrin dye.

11. The composition of any one of claims 1, 2, 3, 9 or 10 wherein the thermochromic aryl diacetylene component is a mixture of said diacetylenes which polymerize at different temperatures to different colored polymers.

* * * * *